(12) United States Patent
Sohn et al.

(10) Patent No.: US 9,118,041 B2
(45) Date of Patent: Aug. 25, 2015

(54) DIRECT LIQUID FEED FUEL CELL SYSTEM (75) Inventors: Dong-kee Sohn, Seoul (KR); Sang-Kyun Kang, Seoul (KR); Kyung Hwan Choi, Suwon-si (KR); Young-Jae Kim, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1454 days.

(21) Appl. No.: 11/442,530

(22) Filed: May 30, 2006

(65) Prior Publication Data

US 2007/0178358 A1    Aug. 2, 2007

(30) Foreign Application Priority Data

Jan. 27, 2006    (KR) .................. 10-2006-0009034

(51) Int. Cl.
*H01M 8/04* (2006.01)
*H01M 8/02* (2006.01)
*H01M 8/10* (2006.01)

(52) U.S. Cl.
CPC ........ *H01M 8/0258* (2013.01); *H01M 8/04007* (2013.01); *H01M 8/04089* (2013.01); *H01M 8/04194* (2013.01); *H01M 8/1011* (2013.01); *H01M 8/04059* (2013.01); *Y02E 60/523* (2013.01)

(58) Field of Classification Search
None
See application file for complete search history.

(56) References Cited

U.S. PATENT DOCUMENTS

| | | | |
|---|---|---|---|
| 5,773,162 A * | 6/1998 | Surampudi et al. | 429/39 |
| 5,853,910 A * | 12/1998 | Tomioka et al. | 429/17 |
| 5,958,616 A * | 9/1999 | Salinas et al. | 429/494 |
| 6,497,971 B1 | 12/2002 | Reiser | |
| 2003/0157396 A1 * | 8/2003 | Beckmann et al. | 429/44 |
| 2005/0008912 A1 | 1/2005 | Yang et al. | |
| 2005/0142421 A1 * | 6/2005 | Lisgaras et al. | 429/38 |
| 2005/0164061 A1 | 7/2005 | An et al. | |
| 2005/0244241 A1 * | 11/2005 | Miyazaki et al. | 410/66 |
| 2006/0024544 A1 * | 2/2006 | Nielsen et al. | 429/26 |

FOREIGN PATENT DOCUMENTS

| | | |
|---|---|---|
| CN | 1537063 | 10/2004 |
| EP | 0 873 899 | 10/1998 |
| JP | 4-355061 | 12/1992 |
| JP | P2004-146303 A | 5/2004 |

(Continued)

OTHER PUBLICATIONS

AIPI Machine translation of JP 2004-146303.*
Machine Translation of JP2004-335307.*
Certificate of Patent No. ZL200610087659 issued in the corresponding Chinese application on Dec. 23, 2009 (including the Chinese Application No. CN 100573987C).

(Continued)

*Primary Examiner* — Maria J Laios
(74) *Attorney, Agent, or Firm* — Christie, Parker & Hale, LLP (57) ABSTRACT

A direct liquid feed fuel cell system that includes a housing, a fuel cell stack in which air flow channels are formed, in the housing; and a fan that supplies air between the housing and a part of the air flow channels, wherein the fuel cell stack is obliquely mounted toward the fan. The fuel cell system can be arranged so that the airflow channels are substantially vertical, in order for air to be supplied between the housing and an upper part of the airflow channels, with the fuel cell stack downwardly obliquely mounted toward the fan. Furthermore, an outlet in the housing on an opposite side of the fuel cell stack from the fan can allow air that has passed through the air flow channels to be exhausted from the fuel cell system after passing through a space between a part of the fuel cell stack and the housing.

18 Claims, 7 Drawing Sheets

(56) References Cited

FOREIGN PATENT DOCUMENTS

| JP | 2004-207106 | 7/2004 |
| JP | P2004-192974 A | 7/2004 |
| JP | 2004-265787 | 9/2004 |
| JP | P2004-259535 A | 9/2004 |
| JP | P2004-335307 A | 11/2004 |
| JP | P2006-202524 A | 8/2006 |
| JP | P2007-115696 A | 5/2007 |
| JP | P2007-257991 A | 10/2007 |
| KR | 10-2005-0079421 A | 8/2005 |

OTHER PUBLICATIONS

Office Action issued by the Japanese Patent office on Sep. 1, 2009.
Korean Notice of Allowance for KP 10-2006-0009034. dated Mar. 28, 2013, 5 pages.
English Machine Translation of JP 2004-207106, dated Jul. 22, 2004, 24 pages.
English Machine Translation of JP 2004-265787, dated Sep. 24, 2004, 28 pages.

* cited by examiner

DIRECT LIQUID FEED FUEL CELL SYSTEM

CROSS-REFERENCE TO RELATED PATENT APPLICATIONS

This application claims the benefit of Korean Application No. 2006-9034, filed Jan. 27, 2006 in the Korean Intellectual Property Office, the disclosure of which is incorporated herein in its entirety by reference.

BACKGROUND OF THE INVENTION

1. Field of the Invention

Aspects of the present invention relate to a direct liquid feed fuel cell system having a compact air supply line and a fuel cell stack cooling device.

2. Description of the Related Art

A direct liquid feed fuel cell is an apparatus that generates electricity through an electrochemical reaction between an organic fuel, such as methanol or ethanol, and an oxidant, i.e., oxygen. The electricity generated by a direct liquid feed fuel cell has high specific energy density and high current density. Also, since a liquid fuel, e.g., methanol, is fed directly to an anode electrode, the direct liquid feed fuel cell does not require a peripheral device, such as a fuel reformer, and the liquid fuel is stored and supplied easily.

Figure 1:
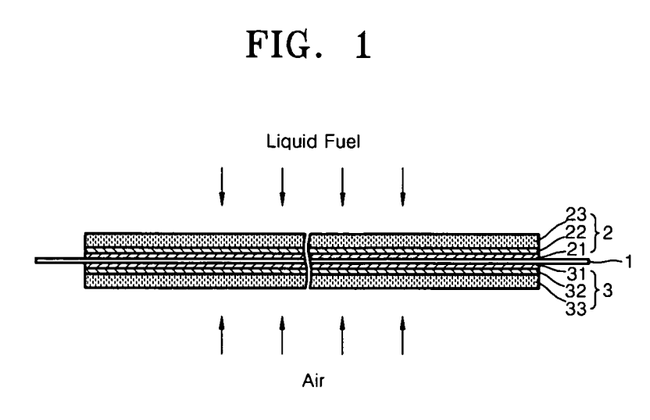
FIG. 1 is a cross-sectional view of a direct liquid feed fuel cell.

FIG. 1 is a cross-sectional view of a direct liquid feed fuel cell. Referring to FIG. 1, the direct feed fuel cell has a structure in which an electrolyte membrane 1 is interposed between an anode 2 and a cathode 3. The anode 2 includes a diffusion layer 22 to supply and diffuse a fuel, a catalyst layer 21 where an oxidation reaction of the fuel occurs, and an electrode supporting layer 23. The cathode 3 also includes a diffusion layer 32 for supplying and diffusing an oxidant, a catalyst layer 31 where a reduction reaction of the fuel occurs, and an electrode supporting layer 33. The catalyst of the electrode reaction is formed of a noble metal having superior catalytic characteristics at low temperatures, such as platinum, and to avoid catalyst poisoning by carbon monoxide (CO), which is a by-product of the electrode reaction, the catalyst can be an alloy of a transition metal, such as ruthenium, rhodium, osmium, or nickel. The electrode supporting layers 23 and 33 can be made of waterproof carbon paper or waterproof carbon fiber to easily supply fuel and discharge reaction products. The electrolyte membrane 1 is a hydrogen ion exchange membrane that has an ion conductivity and can contain moisture, and may be a polymer membrane having a thickness of 50-200 μm.

An electrode reaction of a direct methanol fuel cell (DMFC), which is a type of direct liquid feed fuel cell, includes an anode reaction where fuel is oxidized and a cathode reaction where hydrogen and oxygen are reduced, as described below.

$$CH_3OH+H_2O \rightarrow CO_2+6H^++6e^- \text{(Anode reaction)} \quad \text{[Reaction 1]}$$

$$3/2 O_2+6H^++6e^- \rightarrow 3H_2O \text{(Cathode reaction)} \quad \text{[Reaction 2]}$$

$$CH_3OH+3/2 O_2 \rightarrow 2H_2O+CO_2 \text{(Overall reaction)} \quad \text{[Reaction 3]}$$

Carbon dioxide, hydrogen ions, and electrons are produced at the anode 2 where the fuel is oxidized (reaction 1). The hydrogen ions migrate to the cathode electrode 3 through the electrolyte membrane 1. Water is produced by the reduction reaction between the hydrogen ions, electrons transferred from an external circuit, and oxygen at the cathode 3 (reaction 2). Accordingly, water and carbon dioxide are produced as the result of the overall electrochemical reaction (reaction 3) between methanol and oxygen. Two moles of water are produced when one mole of methanol reacts with oxygen.

The liquid fuel used in the fuel cell may be a mixture of pure methanol and water produced in the system or already stored in the fuel cell. When a fuel of high concentration is used, the performance of the fuel cell is greatly reduced due to crossover of the fuel at the electrolyte membrane (hydrogen ion exchange membrane). Therefore, methanol diluted to a low concentration, such as 0.5 to 2 M (2 to 8 volume %), is generally used.

The theoretical voltage that can be generated by a unit cell of a DMFC is approximately 1.2 V. However, an open circuit voltage at an ambient temperature and at atmospheric pressure is less than 1 V due to a voltage drop caused by an active over-voltage and a resistance over-voltage. In reality, an actual operating voltage lies in the range of 0.4-0.6 V. Therefore, to obtain higher voltages, a plurality of unit cells is connected in series. Unit cells can be connected to form a monopolar structure in which a plurality of unit cells are arranged on one electrolyte membrane, or a stack structure in which a plurality of unit cells are stacked.

A fuel cell can be used as a power source of a mobile electronic device, for example, a computer notebook. A fuel cell used for a mobile electronic device requires a compact structure. On the other hand, fuel cells generate a lot of heat due to the electrode reactions, and in some cases, a fuel cell temperature may reach 70° C. However, to use fuel cells in electronic devices, generally, the fuel cell temperature is required to be maintained below 60° C.

SUMMARY OF THE INVENTION

Aspects of the present invention provide a direct liquid feed fuel cell system having a compact air supply line to supply air to a cathode.

Aspects of the present invention also provide a direct liquid feed fuel cell system having a cooling device to dissipate heat generated by the fuel cell system.

According to an aspect of the present invention, there is provided a direct liquid feed fuel cell system comprising: a housing; a fuel cell stack in which air flow channels are formed, in the housing; and a first fan that supplies air between the housing and a first part of the air flow channels, wherein the fuel cell stack is obliquely mounted toward the first fan. While not required in all aspects, the airflow channels may be substantially vertical, such that the first part of the airflow channels is an upper part, wherein the fuel cell stack is downwardly obliquely mounted toward the fan.

While not required in all aspects, the direct liquid feed fuel cell system may further comprise an outlet that is disposed in the housing to be opposite to the first fan from the fuel cell stack, wherein air that has passed through the air flow channels is discharged to the outside through the outlet after passing through a space between a first part of the fuel cell stack and the housing. While not required in all aspects, the first part of the fuel cell stack may be a lower part.

While not required in all aspects, the direct liquid feed fuel cell system may further comprise a cooling device to cool the fuel cell stack.

While not required in all aspects, the cooling device may comprise a cooling fin formed on a lower part of the housing in a region corresponding to the fuel cell stack.

While not required in all aspects, the direct liquid feed fuel cell system may further comprise a second fan to cool the cooling fin.

While not required in all aspects, an air path may be formed between the outlet and the second fan and may be connected to the cooling fin, and air supplied from the second fan may cools the outlet via the air path.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
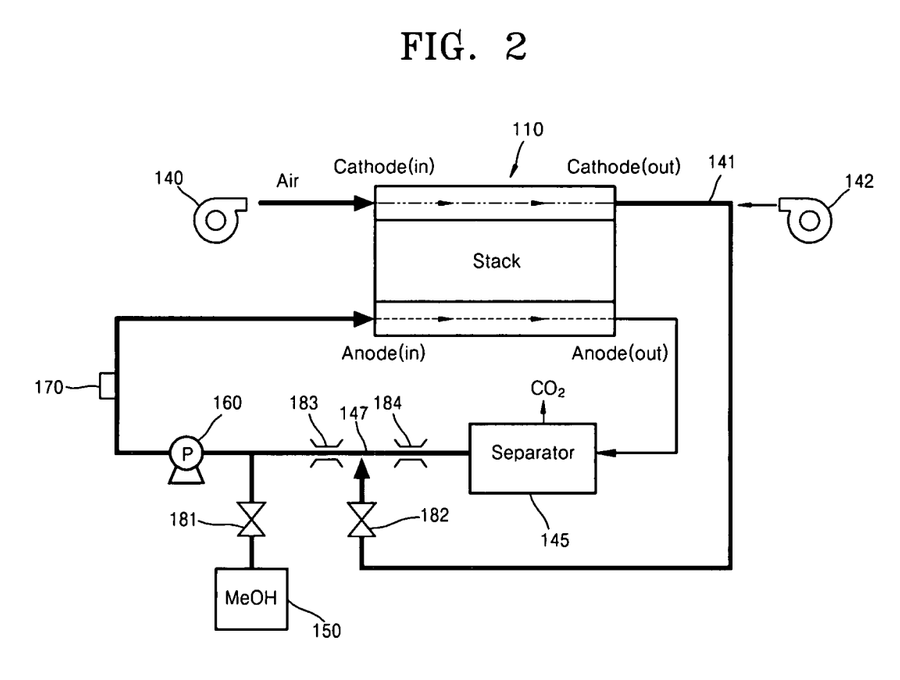
FIG. 2 is a schematic drawing of a direct liquid feed fuel cell system according to an embodiment of the present invention.

FIG. 2 is a schematic drawing of a direct liquid feed fuel cell system according to an embodiment of the present invention.

Referring to FIG. 2, air for use in a reduction reaction is supplied to a cathode of a fuel cell stack 110 from a first fan 140, and the air that has passed through the cathode is discharged from the fuel cell stack 110 together with water produced by the cathode reaction. The air leaving the fuel cell stack 110 is at a temperature of approximately 70° C., and includes water vapor. When a pipe line 141 through which the air and water are discharged is cooled by a second fan 142, the temperature of the discharged air with vapor can be reduced below 60° C., and thus a portion of the vapor condenses into water. The condensed water is received by an anode fuel supply line 147 together with the water produced at the cathode. High concentration or pure methanol stored in a fuel cartridge 150, the water recovered from the cathode, and liquid fuel recovered from the anode are mixed in the anode fuel supply line 147 and supplied into the anode. A mixture of unreacted fuel that has passed through the anode and carbon dioxide is inputted into a separator 145 and separated into a gas and a diluted fuel in the separator 145. The carbon dioxide is exhausted to the outside, and the diluted fuel enters a water pump 160.

Fuel in the fuel cartridge 150 and recovered water are transported to the anode by the water pump 160 through first and second valves 181 and 182, respectively.

A methanol sensor 170 can be installed in the anode fuel supply line 147. The methanol sensor 170 measures a concentration of methanol in the liquid fuel supplied to the anode. The first and second valves 181 and 182 are controlled according to the concentration of the methanol to control the methanol concentration in the liquid fuel supplied to the anode. Restrictors 183 and 184 control the pressure between the separator 145 and the first and second valves 181 and 182.

Figure 3:
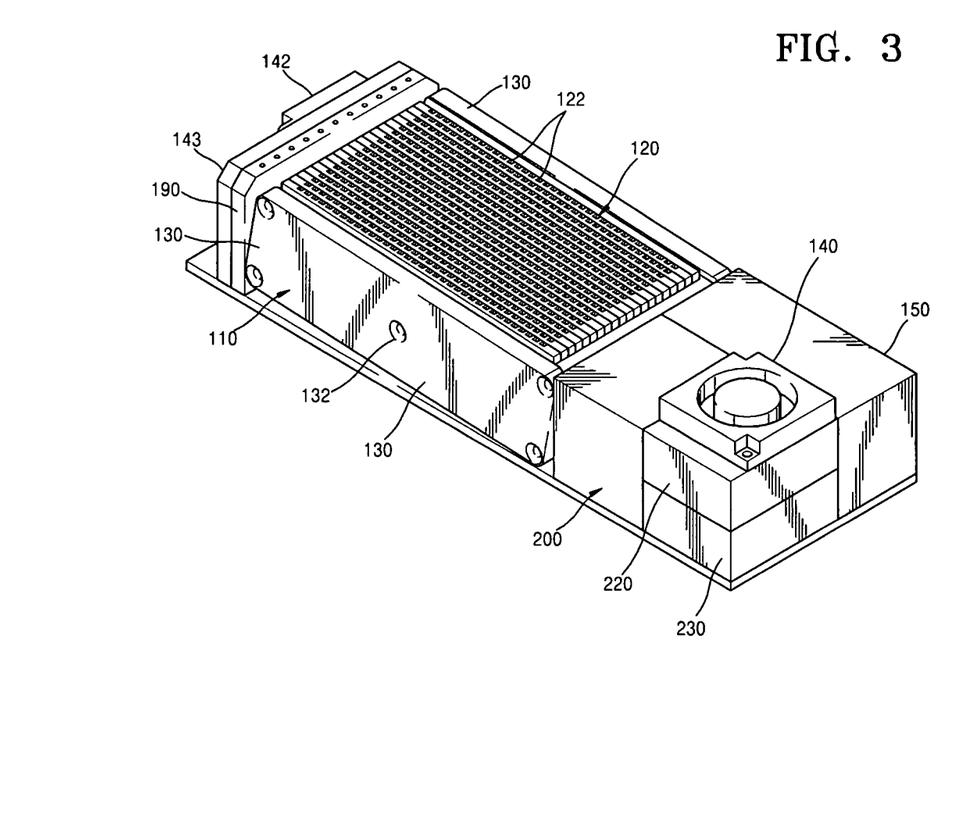
FIGS. 3 and 4 are perspective views of the direct liquid feed fuel cell system according to an embodiment of the present invention.
Figure 4:
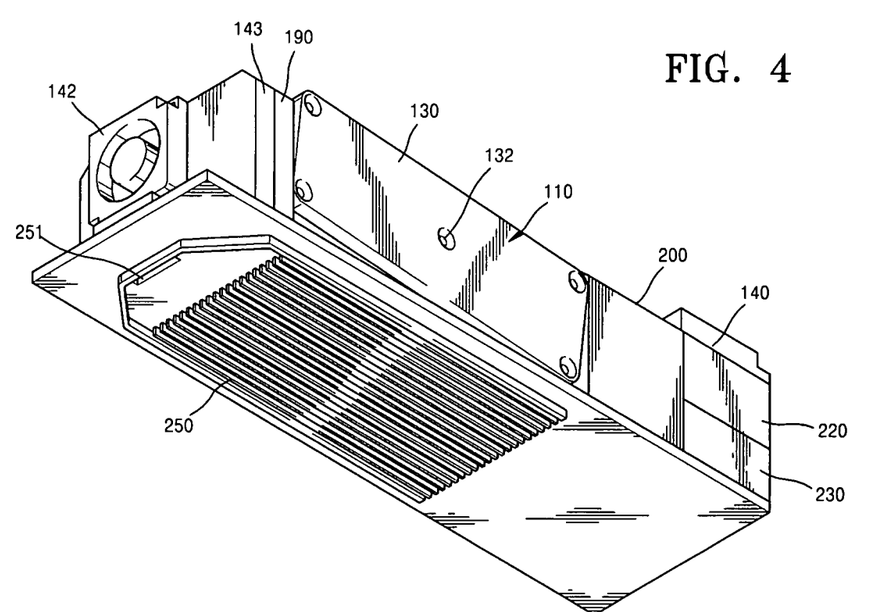

FIGS. 3 and 4 are perspective views of the direct liquid feed fuel cell systems according to an embodiment of the present invention. FIG. 3 is a perspective view of the direct liquid feed fuel cell system from above, and FIG. 4 is a perspective view of the direct liquid feed fuel cell system from below. A housing 102 (see FIG. 7) of the direct liquid feed fuel cell system is not shown in FIGS. 3 and 4. Like reference numerals in the drawings refer to like elements, and the detailed descriptions thereof will not be repeated.

Referring to FIGS. 3 and 4, the direct liquid feed fuel cell system includes the fuel cell stack 110 that generates electricity, a fuel cell stack cooling device, a circulating unit 200 that transports fuel to the fuel cell stack 110 and recovers water and fuel that have passed through the fuel cell stack 110, a circuit unit 220 that supplies electrical energy generated by the fuel cell stack 110 to an electronic device, and a fuel cartridge 150 that stores methanol supplied to the circulating unit 200.

Figure 5:
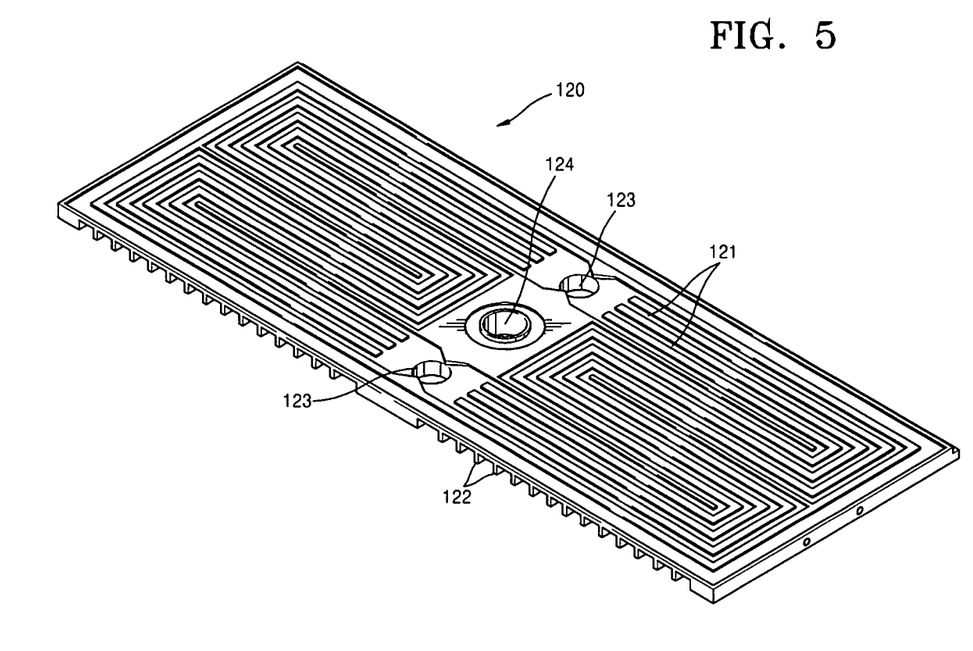
FIGS. 5 and 6 are perspective views of a bipolar plate of the direct liquid feed fuel cell of FIG. 2.
Figure 6:
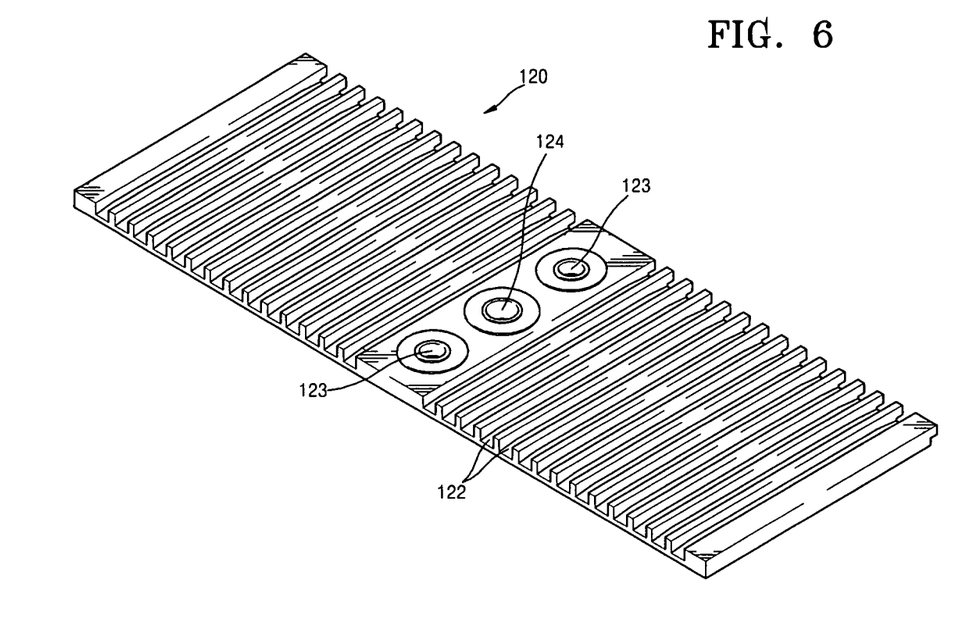

The fuel cell stack 110 comprises a plurality of unit cells. Each of the unit cells includes a membrane electrode assembly (MEA) and a bipolar plate 120 having flow channels through which air and a liquid fuel flow in contact with a cathode and an anode of the MEA, respectively. FIGS. 5 and 6 are perspective views of the bipolar plate 120.

The circulating unit 200 includes the separator 145, the water pump 160, and the first and second valves 181 and 182.

Referring to FIGS. 5 and 6, liquid flow channels 121 are formed on a surface of the bipolar plate 120 contacting the anode and air flow channels 122 are formed on the opposite surface of the bipolar plate 120. The bipolar plate 120 has two through holes 123 through which a liquid fuel passes and a coupling hole 124 for coupling the bipolar plates 120. One of the two through holes 123 is a path through which a liquid fuel supplied from the circulating unit 200 enters the liquid flow channels 121, and the other of the two through holes 123 is a path through which unreacted liquid fuel is transported to the circulating unit 200 after the unreacted liquid fuel has passed through the liquid flow channels 121.

Referring to FIG. 6, the air flow channels 122 are disposed in parallel. Both ends of the air flow channels 122 are exposed when the bipolar plates 120 are stacked as shown in FIG. 3.

Referring to FIG. 3, end plates 130 are mounted on both ends of the fuel cell stack 110. Central holes 132 of the end plates 130 correspond to the coupling hole 124 of the bipolar plate 120. Two paths (not shown) connected to the through holes 123 are formed inside of one of the two end plates 130. The liquid fuel is supplied to the bipolar plates 120 from the circulating unit 200 through one of the two paths, and unreacted liquid fuel is recovered by the separator 145 of the circulating unit 200 from the bipolar plate 120 through the other path.

Figure 7:
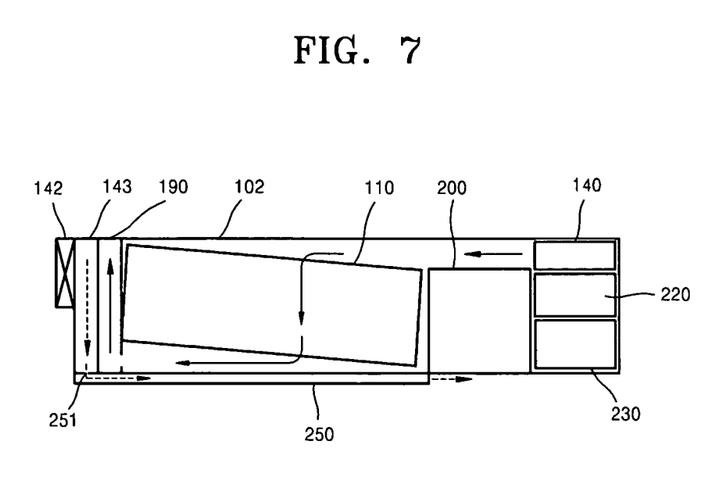
FIG. 7 is a side view of the direct liquid feed fuel cell system of FIG. 3.

FIG. 7 is a side view of the direct liquid feed fuel cell system of FIG. 3.

Referring to FIGS. 3, 4, and 7, the fuel cell stack 110 is obliquely mounted in the housing 102. The air flow channels 122 are vertically disposed, and upper and lower ends of the air flow channels 122 are exposed. The circulating unit 200 is mounted on a side of the fuel cell stack 110, and the first fan 140 is mounted on a side of the circulating unit 200. An outlet 190 and the second fan 142 are mounted on the other side of the fuel cell stack 110. A cooling fin 250 is mounted on a lower part of the housing 102 at a region corresponding to the fuel cell stack 110. A cover (not shown) is mounted on the cooling fin 250, but in FIG. 4, for convenience of explanation, the cover is excluded. The circuit unit 220 for controlling and converting the electrical power generated can be mounted under the first fan 140, and a backup battery 230 can be mounted under the circuit unit 220. The cooling fin 250 and the second fan 142 are cooling devices for the fuel cell stack 110.

The fuel cell stack 110 is downwardly obliquely mounted toward the first fan 140 in the housing 102. Air supplied by the first fan 140 flows downward through the air flow channels 122 formed in the bipolar plate 120. The air that has entered between a lower part of the fuel cell stack 110 and the housing 102 is discharged to the outside through the outlet 190 (see solid arrows in FIG. 7).

An air path 143 through which air supplied by the second fan 142 passes is formed between the outlet 190 and the second fan 142, and is connected to an inlet 251 of the cooling fin 250.

The air supplied from the second fan 142 cools the outlet 190 while passing through the air path 143, and also cools the fuel cell stack 110 while being discharged to the outside through the inlet 251 and the cooling fin 250 (see dotted arrows in FIG. 7). While not required in all aspects, a cooling fin can also be located in the air path 143 to cool the outlet 190. Also, the second fan 142 condenses water vapor by cooling air that has passed through the air flow channels 122. The water condensed by the second fan 142 and water produced by the cathode reaction are received by the circulating unit 200 through a wicking member (not shown).

According to another embodiment of the present invention, the fuel supply line passes along the outlet 190 before the fuel is supplied to the anode of the fuel cell stack 110 to cool the outlet 190 as a cooling device of the fuel cell stack 110.

As described above, a direct liquid feed fuel cell system according to aspects of the present invention has a compact structure of air supply line to the cathode and a fuel cell stack cooling device. Although reference is made to relative terms such as vertically disposed, upper, lower, etc., it is understood that such terms are used for convenience in the description and are not intended to limit the invention to any particular global orientation.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A direct liquid feed fuel cell system comprising;
a housing;
a fuel cell stack in the housing and having a first end, a second end, and a longitudinal axis extending through a center of the first end and a center of the second end, the fuel cell stack comprising a plurality of plates in which air flow channels are formed and arranged in a direction perpendicular to the longitudinal axis; and
a first fan to supply air between the housing and the fuel cell stack, wherein the air supplied by the first fan is configured to be output by the first fan along a central axis,
wherein the fuel cell stack is obliquely mounted relative to the housing, such that an acute angle is formed between the longitudinal axis and the central axis, and such that openings corresponding to the air flow channels of each of the plates are biased toward the first fan.

2. The direct liquid feed fuel cell system of claim 1, wherein the airflow channels are substantially transverse relative to a direction of the air supplied from the first fan, the first fan supplies air between the housing and an upper part of the airflow channels, and the fuel cell stack is downwardly obliquely mounted toward the first fan.

3. The direct liquid feed fuel cell system of claim 1, further comprising an outlet in the housing on an opposite side of the fuel cell stack from the first fan, wherein air that has passed through the air flow channels is discharged to the outside through the outlet after passing through a space between a part of the fuel cell stack and the housing.

4. The direct liquid feed fuel cell system of claim 3, wherein air that has passed through the air flow channels is discharged to the outside through the outlet after passing through a space between a lower part of the fuel cell stack and the housing.

5. The direct liquid feed fuel cell system of claim 3, further comprising a cooling device to cool the fuel cell stack.

6. The direct liquid feed fuel cell system of claim 5, wherein the cooling device comprises a cooling fin formed on a part of the housing in a region corresponding to the fuel cell stack.

7. The direct liquid feed fuel cell system of claim 6, wherein the cooling fin is formed on a lower part of the housing in a region corresponding to the fuel cell stack.

8. The direct liquid feed fuel cell system of claim 6, further comprising a second fan for cooling the cooling fin.

9. The direct liquid feed fuel cell system of claim 8, wherein an air path is formed between the outlet and the second fan and is connected to the cooling fin, and air supplied from the second fan cools the outlet via the air path.

10. A direct liquid feed fuel cell system, comprising:
a housing; and
a first fan to feed air through air flow channels in a fuel cell stack, wherein the first fan is directed at an angle to the air flow channels;
an outlet formed in the housing, on an opposite side of the fuel cell stack from the first fan, to externally discharge air that has passed through the air flow channels and a space between the fuel cell stack and the housing;
a cooling fin formed on the housing, to extract heat from the fuel cell stack; and
a second fan to feed air along an air passageway that extends parallel to the outlet and to feed air along the cooling fin, so as to cool the outlet and the cooling fin, wherein the air fed along the air passageway is configured to flow in a direction substantially opposite to a direction of flow of the air fed through the outlet.

11. The direct liquid feed fuel cell system of claim 10, wherein the fuel cell stack is obliquely mounted in the housing.

12. The direct liquid feed fuel cell system of claim 10, wherein the fuel cell stack comprises:
a membrane electrode assembly having an anode and a cathode; and
at least two bipolar plates having flow channels through which air flows in contact with the cathode and a liquid fuel flows in contact with the anode.

13. The direct liquid feed fuel cell system of claim 10, further comprising a circulating unit to transport a fuel to the fuel cell stack and recover water and the fuel that have passed through the fuel cell stack, the circulating unit comprising:
a separator to separate a gas from the unreacted fuel that has passed through an anode of the fuel cell stack;
a water pump to transport the fuel and water; and
a valve to control a concentration of the fuel.

14. The direct liquid feed fuel cell system of claim 13, further comprising a fuel concentration sensor to measure the concentration of the fuel and control the valve according to the concentration of the fuel.

15. The direct liquid feed fuel cell system of claim 10, further comprising:
- a circuit unit to supply electrical energy generated by the fuel cell stack to an electronic device;
- a fuel cartridge to store fuel to supply to an anode of the fuel cell stack; and a battery backup to supply backup electrical energy.

16. The direct liquid feed fuel cell system of claim 10, wherein the outlet condenses and collects water from the air fed there through.

17. The direct liquid feed fuel cell system of claim 16, further comprising a fuel supply line formed along the outlet before the fuel is supplied to an anode of the fuel cell stack, to cool the outlet.

18. The direct liquid feed fuel cell system of claim 10, wherein the fuel is methanol or ethanol.

\* \* \* \* \*